United States Patent
Kawase et al.

(10) Patent No.: US 11,121,403 B2
(45) Date of Patent: Sep. 14, 2021

(54) PRODUCTION METHOD OF ELECTRODE FOR ALL-SOLID-STATE BATTERIES AND PRODUCTION METHOD OF ALL-SOLID-STATE BATTERY

(71) Applicant: Hitachi Zosen Corporation, Osaka (JP)

(72) Inventors: Hirokazu Kawase, Osaka (JP); Risa Nagai, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 130 days.

(21) Appl. No.: 16/479,698

(22) PCT Filed: Jan. 23, 2018

(86) PCT No.: PCT/JP2018/001980
§ 371 (c)(1),
(2) Date: Jul. 22, 2019

(87) PCT Pub. No.: WO2018/139449
PCT Pub. Date: Feb. 8, 2018

(65) Prior Publication Data
US 2021/0119246 A1    Apr. 22, 2021

(30) Foreign Application Priority Data

Jan. 24, 2017   (JP) .............................. JP2017-010388

(51) Int. Cl.
*H01M 10/0562* (2010.01)
*H01M 4/04* (2006.01)
(Continued)

(52) U.S. Cl.
CPC ....... *H01M 10/0562* (2013.01); *H01M 4/043* (2013.01); *H01M 4/0471* (2013.01);
(Continued)

(58) Field of Classification Search
CPC ......... H01M 10/0525; H01M 10/0562; H01M 10/0585; H01M 2004/027;
(Continued)

(56) References Cited

U.S. PATENT DOCUMENTS

2012/0237834 A1   9/2012  Ogasa
2014/0199598 A1   7/2014  Hoshina et al.
(Continued)

FOREIGN PATENT DOCUMENTS

JP   2012-129150 A    7/2012
JP   2012-209256 A   10/2012
(Continued)

OTHER PUBLICATIONS

Extended European Search Report dated Oct. 13, 2020 issued in corresponding European Patent Application No. 18744641.4 (8 pgs.).
(Continued)

*Primary Examiner* — Carlos Barcena
(74) *Attorney, Agent, or Firm* — Pillsbury Winthrop Shaw Pittman, LLP (57) ABSTRACT

In a production method of an electrode for all-solid-state batteries, the electrode having an electrode mixture layer containing active material particles and solid electrolyte particles, the solid electrolyte particles include a first group of particles having an average particle diameter d1, and a second group of particles having an average particle diameter d2. The production method includes: a first mixing step of dry-mixing the active material particles and the first group of particles, to obtain a mixture A; a second mixing step of dry-mixing the mixture A and the second group of particles, to obtain a mixture B; and a pressing step of pressing the
(Continued)

--- a first mixing step of dry-mixing the active material particles and the first group of particles to, obtain a mixture A, where the average particle diameter d2 is 6 μm or more

↓ a second mixing step of dry-mixing the mixture A and the second group of particles, to obtain a mixture B, where a ratio of the average particle diameter d2 to the average particle diameter d1: d2/d1 satisfies d2/d1 ≥ 1.5

↓ a pressing step of pressing the mixture B to form the electrode mixture layer mixture B to form the electrode mixture layer. A ratio of the average particle diameter d2 to the average particle diameter d1:d2/d1 satisfies d2/d1≥1.5.

14 Claims, 2 Drawing Sheets

(51) Int. Cl.
    *H01M 4/136*     (2010.01)
    *H01M 4/36*     (2006.01)
    *H01M 10/0525*     (2010.01)

(52) U.S. Cl.
    CPC ........... *H01M 4/136* (2013.01); *H01M 4/364* (2013.01); *H01M 4/366* (2013.01); *H01M 10/0525* (2013.01)

(58) Field of Classification Search
    CPC ... H01M 2004/028; H01M 2300/0068; H01M 4/043; H01M 4/0471; H01M 4/13; H01M 4/131; H01M 4/133; H01M 4/136; H01M 4/139; H01M 4/1391; H01M 4/1393; H01M 4/1397; H01M 4/364; H01M 4/366; H01M 4/505; H01M 4/525; H01M 4/5285; H01M 4/587; H01M 4/62
See application file for complete search history.

(56) References Cited

U.S. PATENT DOCUMENTS

| | | |
|---|---|---|
| 2015/0325844 A1 | 11/2015 | Inoue |
| 2015/0340681 A1 | 11/2015 | Iwasaki et al. |
| 2016/0028108 A1* | 1/2016 | Hashimoto ......... H01M 4/0404 156/60 |
| 2016/0359194 A1 | 12/2016 | Meguro et al. |
| 2018/0323469 A1* | 11/2018 | Lim ..................... H01M 4/043 |

FOREIGN PATENT DOCUMENTS

| | | |
|---|---|---|
| JP | 2013-157084 A | 8/2013 |
| JP | 2014-22074 A | 2/2014 |
| JP | 2014-143133 A | 8/2014 |
| WO | 2013/136488 A1 | 9/2013 |
| WO | 2014/132333 A1 | 9/2014 |
| WO | WO-2014132333 A1 * | 9/2014 .............. H01M 4/13 |
| WO | 2015/125800 A1 | 8/2015 |

OTHER PUBLICATIONS

International Search Report PCT/JP2018/001980 dated Apr. 10, 2018 with English translation.

* cited by examiner

Fig. 1 a first mixing step of dry-mixing the active material particles and the first group of particles to, obtain a mixture A, where the average particle diameter d2 is 6 μm or more a second mixing step of dry-mixing the mixture A and the second group of particles, to obtain a mixture B, where a ratio of the average particle diameter d2 to the average particle diameter d1: d2/d1 satisfies d2/d1 ≥ 1.5 a pressing step of pressing the mixture B to form the electrode mixture layer

*Fig. 2*

PRODUCTION METHOD OF ELECTRODE FOR ALL-SOLID-STATE BATTERIES AND PRODUCTION METHOD OF ALL-SOLID-STATE BATTERY

CROSS-REFERENCE TO RELATED APPLICATIONS

This Application is the U.S. National Phase of PCT/JP2018/001980, filed Jan. 23, 2018, which claims priority to Japanese Patent Application No. 2017-010388, filed Jan. 24, 2017. The subject matter of each of which is incorporated herein by reference in entirety.

TECHNICAL FIELD

The present invention relates to a production method of an electrode for all-solid-state batteries including a solid electrolyte layer, and a production method of an all-solid-state battery.

BACKGROUND ART

Various secondary batteries have been developed recently, among which lithium ion secondary batteries (LIBs) are seen as most promising because of their potential for high energy density. On the other hand, with expansion of the application range of batteries, there has been increasing attention for large-size batteries, such as automobile batteries and stationary batteries. In large-size batteries, securing safety is more important than in small-size batteries. Under such circumstances, high expectation is placed on all-solid-state batteries employing inorganic solid electrolyte, in which, as compared to batteries employing liquid electrolyte, safety can be easily secured even when the battery size is increased, and higher capacity can be easily achieved.

An all-solid-state battery typically includes an electrode group that includes a positive electrode, a negative electrode, and a solid electrolyte layer interposed therebetween. The solid electrolyte layer contains solid electrolyte. The positive electrode and the negative electrode each contain active material, and may contain solid electrolyte so that ion-conducting pathways can be secured.

Patent Literature 1 teaches to prepare a positive electrode mixture by wet-mixing active material particles with a mixture of two kinds of solid electrolyte particles differing in average particle diameter, in an ultrasonic dispersion machine, and fabricate a positive electrode using the prepared positive electrode mixture.

CITATION LIST

Patent Literature [PTL 1] Japanese Patent Laid-Open No. 2013-157084

SUMMARY OF INVENTION

Technical Problem

In the electrode of all-solid-state batteries, it is desirable to cover the surfaces of the active material particles with solid electrolyte particles with no gap left therebetween, so that ions can move smoothly. In this case, it is preferable to use solid electrolyte particles having a small particle diameter. However, especially in the case of dry-mixing active material particles and solid electrolyte particles, when the particle diameter of the solid electrolyte particles is small, the solid electrolyte particles tend to agglomerate with each other and become difficult to be dispersed uniformly in the electrode. Using solid electrolyte particles having a large particle diameter can disperse the solid electrolyte particles comparatively uniformly in the electrode; however, it becomes difficult to cover the surfaces of the active material particles with no gap left therebetween, which sacrifices the ion conductivity.

Solution to Problem

One aspect of the present invention relates to a production method of an electrode for all-solid-state batteries, the electrode having an electrode mixture layer containing active material particles and solid electrolyte particles, the solid electrolyte particles including a first group of particles have an average particle diameter $d_1$, and a second group of particles have an average particle diameter $d_2$.

The method includes:

a first mixing step of dry-mixing the active material particles and the first group of particles, to obtain a mixture A;

a second mixing step of dry-mixing the mixture A and the second group of particles, to obtain a mixture B; and a pressing step of pressing the mixture B to form the electrode mixture layer, wherein a ratio of the average particle diameter $d_2$ to the average particle diameter $d_1$: $d_2/d_1$ satisfies $d_2/d_1 \geq 1.5$.

Another aspect of the present invention relates to a production method of an all-solid-state battery, the method including a step of forming an electrode group, the electrode group including a first electrode, a second electrode having a polarity opposite to a polarity of the first electrode, and a solid electrolyte layer interposed between the first electrode and the second electrode, wherein at least one electrode of the first electrode and the second electrode includes an electrode mixture layer containing active material particles and solid electrolyte particles, the solid electrolyte particles include a first group of particles having an average particle diameter $d_1$, and a second group of particles having an average particle diameter $d_2$, a ratio of the average particle diameter $d_2$ to the average particle diameter $d_1$: $d_2/d_1$ satisfies $d_2/d_1 \geq 1.5$, the step of forming the electrode group includes a first-electrode forming step of forming the first electrode, a step of forming the solid electrolyte layer by using an ion-conductive solid electrolyte by a dry process, and a second-electrode forming step of forming the second electrode, and at least one of the first-electrode forming step and the second-electrode forming step includes: a first mixing step of dry-mixing the active material particles and the first group of particles, to obtain a mixture A; a second mixing step of dry-mixing the mixture A and the second group of particles, to obtain a mixture B; and a pressing step of pressing the mixture B.

Advantageous Effects of Invention

According to the present invention, high ion conductivity can be secured in the electrode of all-solid-state batteries.

Figure 2:
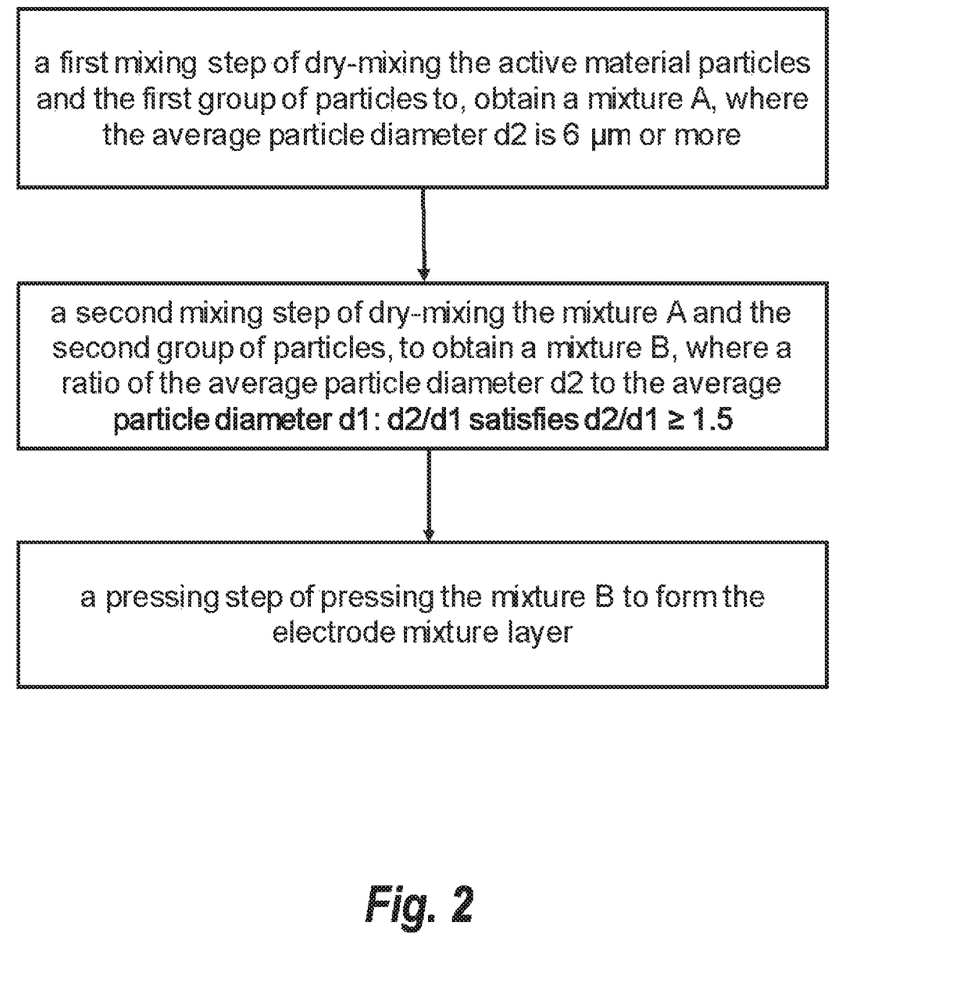
FIG. 2 is a flow chart of a production method of an electrode for all-solid-state batteries.

As shown in FIG. 2, a production method of an electrode for all-solid-state batteries according to an embodiment of the present invention is a method of producing an electrode for all-solid-state batteries, the electrode having an electrode mixture layer containing active material particles and solid electrolyte particles. The solid electrolyte particles include a first group of particles having an average particle diameter $d_1$, and a second group of particles having an average particle diameter $d_2$. The method includes: a step of dry-mixing the active material particles and the first group of particles, to obtain a mixture A (first mixing step); a step of dry-mixing the mixture A and the second group of particles, to obtain a mixture B (second mixing step); and a pressing step of pressing the mixture B. A ratio of the average particle diameter $d_2$ to the average particle diameter $d_1$:$d_2/d_1$ satisfies $d_2/d_1 \geq 1.5$.

DESCRIPTION OF EMBODIMENTS

A production method of an electrode for all-solid-state batteries according to an embodiment of the present invention is a method of producing an electrode for all-solid-state batteries, the electrode having an electrode mixture layer containing active material particles and solid electrolyte particles. The solid electrolyte particles include a first group of particles having an average particle diameter $d_1$, and a second group of particles having an average particle diameter $d_2$. The method includes: a step of dry-mixing the active material particles and the first group of particles, to obtain a mixture A (first mixing step); a step of dry-mixing the mixture A and the second group of particles, to obtain a mixture B (second mixing step); and a pressing step of pressing the mixture B. A ratio of the average particle diameter $d_2$ to the average particle diameter $d_1$:$d_2/d_1$ satisfies $d_2/d_1 \geq 1.5$.

The present invention encompasses a method of producing an all-solid-state battery including the electrode obtained as described above. Specifically, the production method of an all-solid-state battery includes a step of forming an electrode group, the electrode group including a first electrode, a second electrode having a polarity opposite to that of the first electrode, and a solid electrolyte layer interposed between the first electrode and the second electrode. At least one electrode of the first electrode and the second electrode includes an electrode mixture layer containing active material particles and solid electrolyte particles. The solid electrolyte particles include a first group of particles having an average particle diameter $d_1$, and a second group of particles having an average particle diameter $d_2$. Here, a ratio of the average particle diameter $d_2$ to the average particle diameter $d_1$:$d_2/d_1$ satisfies $d_2/d_1 \geq 1.5$. The step of forming the electrode group includes a step of forming the first electrode (first-electrode forming step), a step of forming the solid electrolyte layer by using an ion-conductive solid electrolyte by a dry process, and a step of forming the second electrode (second-electrode forming step). At least one of the first-electrode forming step and the second-electrode forming step includes: a first mixing step of dry-mixing the active material particles and the first group of particles, to obtain a mixture (mixture A); a second mixing step of thy-mixing the mixture A and the second group of particles, to obtain a mixture (mixture B); and a pressing step of pressing the mixture B.

The ion conductivity of active material particles is low. Covering the particle surfaces with the solid electrolyte particles can enhance the ion conductivity. To cover the surfaces of the active material particles as much as possible with the solid electrolyte particles, it is preferable to use solid electrolyte particles having a small particle diameter. However, solid electrolyte particles with small particle diameter tend to agglomerate with each other, and practically, are difficult to sufficiently cover the surfaces of the active material particles. Such a tendency becomes remakable especially in the case of forming an electrode mixture layer without using an organic component, such as a binder or a dispersion medium, or if used, used in a very small amount. On the other hand, when solid electrolyte particles having a large particle diameter are used, agglomeration thereof can be reduced, and the solid electrolyte particles can be relatively uniformly dispersed in the electrode mixture layer. However, the surface coverage of the active material particles with the solid electrolyte particles is reduced, failing to achieve sufficiently improved ion conductivity.

In the above embodiment, solid electrolyte particles including a first group of particles having an average particle diameter $d_1$ and a second group of particles having an average particle diameter $d_2$ are used. Here, $d_2/d_1 \geq 1.5$. In the first mixing step, the active material particles and the first group of particles are dry-mixed, to obtain a mixture A. In the second mixing step, the mixture A and the second group of particles are dry-mixed, to obtain a mixture B. In this way, a large region of the surfaces of the active material particles can be covered with the solid electrolyte particles of the first group, and the solid electrolyte particles of the second group can be highly dispersed in the electrode mixture layer. Therefore, in the electrode mixture layer formed by pressing the mixture B, high ion conductivity can be achieved. As a result, charge and discharge can proceed smoothly, even at a high rate.

The pressing step of the above production method preferably includes at least a step of pressing the mixture B at a pressure of 400 MPa or more and 1500 MPa or less. In this case, the packing density in the electrode mixture layer can be further increased, and the resistance of the electrode mixture layer can be reduced. In the pressing step, at least the mixture B should be pressed. For example, the mixture B may be compacted, or the mixture B may be pressed by pressing the electrode group when forming an all-solid-state battery. Alternatively, the mixture B may be pressed by combining compacting of the mixture B and pressing of the electrode group. In the case of pressing the electrode group, the adhesion between the solid electrolyte layer and the electrode mixture layer is enhanced, and the interface resistance therebetween can be reduced.

Mixing of the active material particles and the first group of particles may be performed under heating, under cooling, or under changing temperatures. Likewise, mixing of the mixture A and the second group of particles may be performed under heating, under cooling, or under changing temperatures. By controlling the temperature at mixing according to the kind of the solid electrolyte particles, it is possible to enhance the surface coverage of the active material particles with the solid electrolyte particles of the first group, and the dispersibility of the solid electrolyte particles of the second group. The mixing of the active material particles and the first group of particles and/or the mixing of the mixture A and the second group of particles may be performed under application of an electric field or a magnetic field, if necessary. In this case also, it is possible to enhance the surface coverage of the active material particles with the solid electrolyte particles of the first group, and the dispersibility of the solid electrolyte particles of the second group. In the case of performing the mixing of the active material particles and the first group of particles and/or the mixing of the mixture A and the second group of particles under heating, the heating temperature is, for example, 30° C. or more and 150° C. or less, preferably 45° C. or more and 120° C. or less.

The mixture A and the mixture B are preferably obtained by mixing components of each mixture in the absence of a binder. In the present embodiment, the solid electrolyte particles can be highly dispersed in the electrode mixture layer, even without using a binder or a dispersion medium.

The average particle diameter d1 of the first group of particles is, for example, 10 or less (e.g., 0.5 μm or more and 10 μm or less), preferably 0.5 μm or more and 6 μm or less. In this case, the surfaces of the active material particles can be more easily covered with the solid electrolyte particles of the first group.

The average particle diameter d2 of the second group of particles needs to satisfy $d2/d1 \geq 1.5$. The average particle diameter d2 is, for example, 6 μm or more and 15 μm or less, preferably 7 μm or more and 10 μm or less. When the average particle diameter d2 is within such a range, the solid electrolyte particles can be more evenly dispersed in the electrode mixture layer, and high ion conductivity can be easily secured.

The average particle diameter d2 of the second group of particles is preferably smaller than an average particle diameter D1 of the active material particles (D1>d2). In this case, the contact area between the solid electrolyte particles of the second group and the active material particles can be increased, and thus ion conductivity can be further enhanced.

The average particle diameter D1 of the active material particles is preferably 20 or less (e.g., 10 μm or more and 20 μm or less), more preferably 10 μm or more and 16 or less. In this case, in relation to the average particle diameter of the solid electrolyte particles, the contact area between the solid electrolyte particles and the active material particles can be easily increased, which is further advantageous in achieving high ion conductivity.

The average particle diameter D1 of the active material particles, the average particle diameter d1 of the first group of particles, and the average particle diameter d2 of the second group of particles herein each refer to a median diameter ($D_{50}$) in a volumetric particle-size distribution measured using a laser diffraction particle size analyzer.

The solid electrolyte particles preferably comprise a sulfide containing Li and P. Such solid electrolyte particles are readily plastically deformed in the pressing step, making it possible to easily improve the adhesion between the active material particles and the solid electrolyte particles and the adhesion between the solid electrolyte particles. Therefore, the resistance in the electrode can be easily reduced.

A ratio of an amount of the solid electrolyte particles to a total amount of the active material particles and the solid electrolyte particles is 5 mass % or more and 40 mass % or less, preferably 10 mass % or more and 40 mass % or less, and more preferably 20 mass % or more and 40 mass % or less. A ratio of an amount of the first group of particles to a total amount of the first group of particles and the second group of particles is, for example, 10 mass % or more and 80 mass % or less, preferably 20 mass % or more and 80 mass % or less. In these cases, while the active material particles can be easily covered with the solid electrolyte particles of the first group, high dispersibility of the solid electrolyte particles in the electrode mixture layer can be secured.

A detailed description will be given below of a production method of an electrode for all-solid-state batteries and a production method of an all-solid-state battery according to the present embodiment.

A production method of an electrode for all-solid-state batteries according to the present embodiment includes: a first mixing step of dry-mixing the active material particles and the first group of particles, to obtain a mixture A; a second mixing step of dry-mixing the mixture A and the second group of particles, to obtain a mixture B; and a pressing step of pressing the mixture B. A production method of an all-solid-state battery according to the present embodiment includes, for example, a step of forming an electrode group, the electrode group including a first electrode, a second electrode, and a solid electrolyte layer interposed between the first electrode and the second electrode. Here, at least one electrode of the first electrode and the second electrode includes an electrode mixture layer containing active material particles and solid electrolyte particles. In these production methods, the solid electrolyte particles include a first group of particles having an average particle diameter d1, and a second group of particles having an average particle diameter d2. A ratio of the average particle diameter d2 to the average particle diameter d1:d2/d1 satisfies $d2/d1 \geq 1.5$.

The step of forming the electrode group includes a step of forming the first electrode (first-electrode forming step), a step of forming the solid electrolyte layer by using an ion-conductive solid electrolyte by a dry process, and a step of forming the second electrode (second-electrode forming step). These steps may be performed in any order. For example, the first electrode may be formed first. Then, the solid electrolyte layer may be formed on one of the principal surfaces of the first electrode, and the second electrode may be formed on the other principal surface of the solid electrolyte layer on the opposite side to the first electrode. Alternatively, the solid electrolyte layer may be formed first. Then, the first electrode may be formed on one of the principal surfaces of the solid electrolyte layer, and the second electrode may be formed on the other principal surface of the solid electrolyte layer, so that the electrode group is formed. When laminating the solid electrolyte layer and the electrode together, if necessary, the solid electrolyte layer and the electrode may be pressed into a composite. Especially in the case of forming the solid electrolyte layer first, preferably, after the first electrode is laminated on the solid electrolyte layer, the laminate is pressed in the thickness direction, into a composite. And preferably, after the solid electrolyte layer and the first electrode are formed into a composite, the composite is turned upside down, and the second electrode is formed on the solid electrolyte layer on the opposite side to the first electrode. In the case where the electrode group includes a plurality of first electrodes and/or second electrodes and a plurality of solid electrolyte layers, the electrodes and the solid electrolyte layer are laminated together such that the solid electrolyte layer is interposed between the first electrode and the second electrode.

In the production method of an all-solid-state battery, at least one of the first-electrode forming step and the second-electrode forming step includes the first mixing step, the second mixing step, and the above pressing step. In the pressing step, the mixture B is pressed, whereby one of the electrodes is formed.

In this way, according to the present embodiment, in the first mixing step, by mixing the first group of particles having a small average particle diameter with the active material particles first, the surfaces of the active material particles can be covered with the first group of particles. Due to the smallness in particle diameter, the first group of particles tend to agglomerate with each other; however, the first group of particles are further mixed with the second group of particles in the second mixing step. This can enhance the dispersibility of the solid electrolyte particles in the electrode mixture layer. Lastly, by the pressing step, high ion conductivity in the electrode mixture layer can be secured.

(First-Electrode Forming Step and Second-Electrode Forming Step)

The all-solid-state battery includes a first electrode and a second electrode having a polarity opposite to that of the first electrode. When the first electrode is a positive electrode, the second electrode is a negative electrode; when the first electrode is a negative electrode, the second electrode is a positive electrode.

The electrode contains at least an active material, and may contain an electrode mixture containing an active material and a solid electrolyte. At least one of the first electrode and the second electrode includes a layer of electrode mixture (electrode mixture layer). Both electrodes may include an electrode mixture layer. At least one of the first-electrode forming step and the second-electrode forming step includes the first mixing step, the second mixing step, and the pressing step. Both electrode forming steps may include the first mixing step, the second mixing step, and the pressing step. In the case where one of the positive electrode and the negative electrode is formed through the first mixing step, the second mixing step, and the pressing step, the other electrode may be a known electrode.

In the first mixing step, the active material particles and the first group of particles are thy-mixed. In the second mixing step, the mixture A and the second group of particles are dry-mixed. Dry mixing herein means mixing components in the absence of liquid. The thy mixing can be performed using a known mixing means used for dry mixing of powdery particles (e.g., mixer, mill).

In the first-electrode forming step, for example, the first electrode can be obtained by depositing an electrode mixture or an active material like a film. Likewise, in the second-electrode forming step, the second electrode can be obtained by depositing an electrode mixture or an active material like a film. Each electrode may be formed by depositing an electrode mixture or active material on a surface of a current collector.

The pressing step needs to be performed after an electrode mixture is deposited. The pressing step may be performed either before or after the electrode is laminated with the solid electrolyte layer or with the other electrode. For example, the pressing step may be performed when pressing the electrode group, by utilizing the pressure applied to the electrode mixture layer.

Deposition of an electrode mixture or an active material can be performed according to any known procedures. Dry processes are simple and advantageous in terms of cost, among which electrostatic screen printing is preferred in terms of making more uniform deposition possible.

In the first electrode and the second electrode, the deposited electrode mixture or active material may be compacted before laminated with the other layer. The compacting pressure is, for example, 1 MPa or more and 30 MPa or less. Alternatively, a film of electrode mixture or active material of the first electrode may be laminated on the preformed solid electrolyte layer, and the film may be compacted. The compacting pressure in this case is, for example, 1 MPa or more and 30 MPa or less.

In a preferred embodiment, compacting the particles or film of the electrode mixture and pressing the electrode group are both performed in the pressing step.

(Active Material Particles)

As the active material particles used for the positive electrode, any positive electrode active material as used in all-solid-state batteries may be used without limitation. For example, in all-solid-state LIBs, examples of the positive electrode active material include: oxides, such as a lithium-containing oxide containing cobalt, nickel, and/or manganese [e.g., lithium cobalt oxide ($LiCoO_2$), lithium nickel oxide ($LiNiO_2$), lithium manganese oxide (e.g., a spinel-type lithium manganese oxide (e.g. $LiMn_2O_4$), a lithium nickel cobalt manganese oxide), $LiNi_{0.8}Co_{0.15}Al_{0.05}O_2$], and a Li-excess composite oxide ($Li_2MnO_3$-$LiMO_2$); and compounds other than oxides. Examples of the compounds other than oxides include an olivine-type compound ($LiMPO_4$), and a sulfur-containing compound (e.g., $Li_2S$). In the above formulae, M represents a transition metal. The positive electrode active material may be used singly or in combination of two or more kinds. In view of obtaining of a high capacity, a lithium-containing oxide containing at least one selected from the group consisting of Co, Ni, and Mn is preferred. The lithium-containing oxide may further contain a typical metal element, such as Al. Examples of the lithium-containing oxide containing Al include an aluminum-containing lithium nickel cobalt oxide.

The active material particles used for the negative electrode may be any known negative electrode active material used in all-solid-state batteries. For example, in all-solid-state LIBs, examples of the negative electrode active material include: a carbonaceous material capable of intercalating and deintercalating lithium ions; and a simple substance, alloy or compound of metals or semimetals capable of intercalating and deintercalating lithium ions. Examples of the carbonaceous material include graphite (e.g., natural graphite, artificial graphite), hard carbon, and amorphous carbon. Examples of the simple substance or alloy of metals and semimetals include lithium metal or alloy, and simple Si. Examples the compound include an oxide, a sulfide, a nitride, a hydride, and a silicide (e.g. lithium silicide). Examples of the oxide include a titanium oxide, and a silicon oxide. The negative electrode active material may be used singly, or in combination of two or more kinds. For example, a silicon oxide and a carbonaceous material may be used in combination. The negative electrode active material is preferably graphite, and may be coated particles comprising graphite particles and an amorphous carbon coating.

The average particle diameter D1 of the active material particles is preferably larger than the average particle diameter d1 of the first group of particles, in view of easily covering the surfaces of the active material particles with the solid electrolyte particles of the first group. As mentioned above, the average particle diameter D1 is preferably larger than the average particle diameter d2 of the second group of particles.

A ratio of the average particle diameter D1 to the average particle diameter d2 (=D1/d2) is, for example, preferably greater than 1 and 2 or less. When D1/d2 is within such a range, the dispersibility of the second group of particles in the electrode mixture layer can be further enhanced.

(Solid Electrolyte Particles)

The solid electrolyte particles used for the electrode mixture layer may be any solid electrolyte that exhibits ion conductivity as used in all-solid-state batteries. The crystalline state of the solid electrolyte is not limited, and may be either crystalline or amorphous. Preferable examples of the solid electrolyte are a sulfide (sometimes referred to as a sulfide-series solid electrolyte (specifically, a sulfide-series inorganic solid electrolyte)), and a hydride (sometimes referred to as a hydride-series solid electrolyte). The solid electrolyte may be used singly or, if necessary, in combination of two more kinds.

For example, in all-solid-state LIBs, the sulfide preferably contains $Li_2S$ and one or two kinds of sulfides each containing at least one element selected from the group consisting of Group 13, Group 14, and Group 15 elements of the periodic table. The elements of Groups 13 to 15 of the periodic table are not limited, and may be, for example, P, Si, Ge, As, Sb, and Al, among which P, Si, and Ge are preferred, and P is particularly preferred. A sulfide containing at least one of these elements (esp., P) and Li is also preferred. Specific examples of the sulfide include $Li_2S$—$Si_2$, $Li_2S$—$P_2S_5$, $Li_2S$—$GeS_2$, $Li_2S$—$B_2S_3$, $Li_2S$—$Ga_2S_3$, $Li_2S$—$Al_2S_3$, $Li_2S$—$GeS_2$—$P_2S_5$, $Li_2S$—$Al_2S_3$—$P_2S_5$, $Li_2S$—$P_2S_3$, $Li_2S$—$P_2S_3$—$P_2S_5$, LiX—$Li_2S$—$P_2S_5$, LiX—$Li_2S$—$Si_2$, and LiX—$Li_2S$—$B_2S_3$ (X:I, Br, or Cl).

An example of the hydride is a complex hydride of lithium borohydride. Specific examples of the complex hydride include $LiBH_4$—LiI-based complex hydride and $LiBH_4$—$LiNH_2$-based complex hydride.

The solid electrolyte particles include the first group particles and the second group particles having different average particle diameters, as described above. The solid electrolyte particles of the first group and those of the second group may be of the same kind or different kinds.

To each electrode, if necessary, any known components used for electrodes in all-solid-state batteries may be added, such as a binder, a conductive aid, and other additives.

In general, in forming an electrode mixture layer, in the case of using an organic component such as a dispersion medium or a binder, voids are left once the organic component is removed. In the present embodiment, by combining the first mixing step of thy-mixing the active material particles and the first group of particles, to obtain a mixture A, with the second mixing step of mixing the mixture A and the second group of particles, to obtain a mixture B, the solid electrolyte particles can be uniformly dispersed in the electrode mixture layer. Furthermore, in the present embodiment, in addition to employing a dry mixing method to mix the active material and the solid electrolyte particles, the mixture B is pressed in the pressing step. This can increase the packability of the active material particles and the solid electrolyte particles in the electrode mixture layer to be formed by pressing, and can reduce the volume of the voids. Therefore, in the present embodiment, the packing density in the electrode mixture layer can be increased to as high as, for example, 90 vol % or more (specifically, 90 vol % or more and 100 vol % or less).

The packing density in the electrode mixture layer can be determined, for example, on an electron microscope photograph of a cross section of the electrode mixture layer. Specifically, the cross-section photograph of the electrode mixture layer is thresholded to distinguish voids from a portion without voids. Then, in a region having a predetermined area (e.g., length 100 μm×width 100 μm) on the cross-section photograph, a ratio of the area (area %) of the portion without pores is determined, and the ratio of the area is taken as corresponding to a packing density by volume (vol %) in the electrode mixture layer.

The current collector may be any current collector used in all-solid-state batteries. The current collector may be in the form of, for example, a metal foil, a plate-like member, or a powder assembly, and may be a film of a material of the current collector. The metal foil may be, for example, an electrolytic foil, or an etched foil. Desirably, the current collector is sturdy enough not to wave or break in the process of forming an electrode mixture layer or an active material layer.

The material of the current collector used for the positive electrode is, for example, a material stable at an oxidation reduction potential of the positive electrode, such as aluminum, magnesium, stainless steel, titanium, iron, cobalt, zinc, tin, or alloys of these. The material of the current collector used for the negative electrode is, for example, a material stable at an oxidation reduction potential of the negative electrode, such as copper, nickel, stainless steel, titanium, or alloys of these.

The thickness of the current collector is, for example, 4 μm or more, and may be 5 μm or more, or 10 μm or more. The thickness of the current collector is, for example, 50 μm or less, preferably 30 μm or less, and may be 20 μm or less. These lower limits and upper limits can be combined in any combination.

The positive electrode and the negative electrode each preferably has a thickness of 50 μm or more and 200 μm or less.

(Solid-Electrolyte-Layer Forming Step)

In the step of forming a solid electrolyte layer, for example, the solid electrolyte layer is formed by a dry process using a solid electrolyte (and an additive, if necessary). In the case of forming a solid electrolyte layer after the first electrode is formed, the solid electrolyte layer may be formed by using a solid electrolyte (and an additive as described below, if necessary) by a dry process on at least one of the principal surfaces of the first electrode. By using a dry process, the packing density in the solid electrolyte layer can be increased, and high ion conductivity can be secured. Furthermore, in view of further increasing the packing density, in the dry process, like in the electrode mixture layer formation, it is preferable not to use an organic component, such as a dispersion medium and a binder (e.g., resin). The solid electrolyte layer is preferably formed by a dry process using a solid electrolyte (and an additive, if necessary), followed by compacting. The compacting pressure is, for example, 1 MPa or more and 10 MPa or less.

Examples of the solid electrolyte include those exemplified for use in the electrode, among which a sulfide is preferred.

The solid electrolyte used in the solid electrolyte layer may be the same as or different from that used in the positive electrode and/or the negative electrode.

To the solid electrolyte layer, any known additive used for the solid electrolyte layer of all-solid-state batteries may be added, if necessary.

The solid electrolyte layer has a thickness of, for example, 10 μm or more and 200 μm or less, and may be 20 μm or more and 200 μm or less.

(Pressing Step)

In the pressing step, as mentioned above, at least the mixture B should be pressed. For example, the mixture B may be pressed by compacting the particles or film of the mixture B, or by pressing the electrode group. Alternatively, compacting and pressing of the electrode group may be combined. In other words, the pressing step may be performed either in the electrode forming step, or after the formation of the electrode group, or both.

The electrode group is housed in a battery case. The pressing of the electrode group in the pressing step may be performed either before or after housed in the battery case. For example, when the battery case is made of a laminate film, after the electrode group is housed in the battery case, the electrode group together with the battery case (i.e., battery) may be pressed.

The pressing step preferably includes at least a step of pressing the mixture B at a pressure of 400 MPa or more and 1500 MPa or less, or 400 MPa or more and 1200 MPa or less. By applying such a pressure, the solid electrolyte particles contained in the mixture B are plastically deformed and come in close contact with each other. Thus, high ion conductivity can be achieved in the electrode mixture layer. Although such a pressure may be applied when compacting the electrode mixture, particularly, it is preferable to apply such a pressure when pressing the electrode group. By applying such a pressure when pressing the electrode group (or battery), the solid electrolyte particles contained in the solid electrolyte layer are plastically deformed and come in close contact with each other, making it possible to lower the interface resistance, as well as to reduce the volume occupied by voids in the solid electrolyte layer to be extremely small. Moreover, since the solid electrolyte particles are plastically deformed, the adhesion between the solid electrolyte layer and the positive electrode and/or the negative electrode can be increased.

Figure 1:
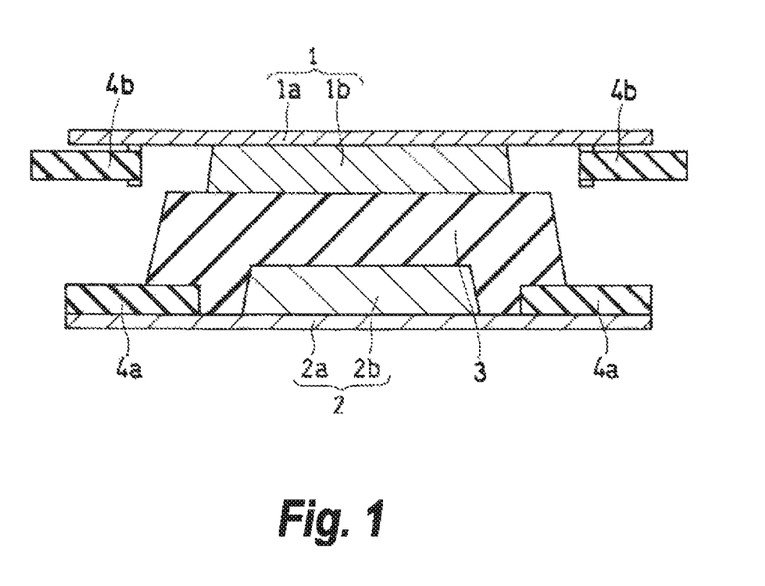
FIG. 1 A schematic vertical cross-sectional view of an electrode group included in an all solid-state battery produced by a method according to an embodiment of the present invention.

Figure is a schematic vertical cross-sectional view of an electrode group included in an all-solid-state battery obtained by the production method according to the present embodiment. The electrode group includes a positive electrode 2, a negative electrode 1, and a solid electrolyte layer 3 interposed therebetween. The positive electrode 2 includes a positive electrode collector 2a, and a positive electrode mixture layer (positive electrode layer) 2b carried thereon. The negative electrode 1 includes a negative electrode current collector 1a, and a negative electrode mixture layer 1b carried thereon. The positive electrode 2 and the negative electrode 1 are disposed such that the positive electrode mixture layer 2b and the negative electrode mixture layer 1b face each other. A solid electrolyte layer 3 is disposed between the positive electrode mixture layer 2b and the negative electrode mixture layer 1b.

The all-solid-state battery may be of various shape types, without limited to the example shown in Figure, such as a circular type, a cylindrical type, a square type, and thin layer flat type. The electrode group may include a plurality of positive electrodes and/or a plurality of negative electrodes. While Figure shows an example where the positive electrode mixture layer and the negative electrode mixture layer are square in shape, this should not be taken as a limitation. The shape of the component members of the all-solid-state battery can be selected as appropriate from, for example, a rectangular shape, a diamond shape, a circular shape, and an oval shape.

In the illustrated example, the positive electrode mixture layer 2b and the negative electrode mixture layer 1b are each square in shape, having a predetermined thickness. On the positive electrode current collector 2a, an annular electrically-insulating layer 4a is disposed so as to surround the positive electrode mixture layer 2b. On the negative electrode current collector 1a, an annular electrically-insulating layer 4b is disposed so as to surround the negative electrode mixture layer 1b. The insulating layers 4a and 4b serve to prevent short-circuit between the positive electrode current collector 2a and the negative electrode current collector 1a. The positive electrode current collector 2a is a square metal foil having a size larger than that of the positive electrode mixture layer 2b; the negative electrode current collector 1a is a square metal foil having a size larger than that of the negative electrode mixture layer 1b. The solid electrolyte layer 3 is formed so as to cover the top and side surfaces of the positive electrode mixture layer 2b, and the top and side surfaces of the insulating layer 4a on the inner circumference side.

The all-solid-state battery can be obtained by housing the electrode group in a battery case. To each of the positive electrode and the negative electrode of the electrode group, a lead is connected at its one end. The leads are, at their other ends, electrically connected to external terminals, which are extended outside the battery case.

The all-solid-state battery may be of various shape types, without limited to the example shown in FIG. 1, such as a circular type, a cylindrical type, a square type, and thin-layer flat type. The electrode group may include a plurality of positive electrodes and/or a plurality of negative electrodes. While FIG. 1 shows an example where the positive electrode mixture layer and the negative electrode mixture layer are square in shape, this should not be taken as a limitation. The shape of the component members of the all-solid-state battery can be selected as appropriate from, for example, a rectangular shape, a diamond shape, a circular shape, and an oval shape.

EXAMPLE

The present invention will be specifically described below with reference to Examples and Comparative Example. The present invention, however, is not limited to the following Examples.

Example 1

(1) Fabrication of all-solid-state batteries

An all-solid-state battery (all-solid-state LIB) as illustrated in Figure was fabricated in the following procedure. The average particle diameter D50 herein means a median diameter in a volumetric particle-size distribution measured using a laser diffraction particle size analyzer.

(a) Fabrication of Positive Electrode 2

$LiNi_{0.8}Co_{0.15}Al_{0.05}O_2$ (D1 ($D_{50}$): 11 μm) serving as positive electrode active material particles, and solid electrolyte particles (d1 ($D_{50}$): approx. 4 μm) serving as a first group of particles were mixed at a mass ratio of 95:5 in a ball mill at 25° C. at a revolution speed of 96 rpm for 15 min. Here, $Li_2S$—$P_2S_5$ solid solution with lithium ion conductivity was used as the solid electrolyte particles.

Next, the obtained mixture (mixture A) and solid electrolyte particles (d2 ($D_{50}$): approx. 8 μm) serving as a second group of particles were mixed at a mass ratio of 90:10 in a ball mill under the same conditions as above, to give a mixture B.

On one surface of an aluminum foil of 40 mm long, 40 mm wide, and 20 μm thick serving as a positive electrode collector 2a, a mask having an opening of 20 mm long and 20 mm wide was placed. A positive electrode mixture layer 2b was formed by a dry process. Specifically, the mixture B was deposited in a predetermined amount so as to cover the opening of the mask, and compacted in the thickness direction at a pressure of 2 MPa using a single action press, into the positive electrode mixture layer 2b. The positive electrode mixture layer 2b had a thickness of 100 μm. The amount of the mixture B to be deposited was adjusted so that the capacity of a positive electrode capacity-regulated battery became 2 mAh/cm².

(b) Fabrication of Solid Electrolyte Layer 3

An annular electrically-insulating layer 4a was disposed around the positive electrode mixture layer 2b. With a mask placed over the positive electrode 2 on the positive electrode mixture layer 2b side, the make having an opening of 22 mm long and 22 mm wide for exposing therefrom the top surface of the positive electrode mixture layer 2b and the top surface of the insulating layer 4a on the inner circumference side, a solid electrolyte layer 3 was formed by a dry process. Specifically, $Li_2S$—$P_2S_5$ solid solution serving as a lithium ion-conductive solid electrolyte was deposited in a predetermined amount so as to cover the opening of the mask, and pressed (compacted) in the thickness direction at a pressure of 2 MPa using a single action press, into the solid electrolyte layer 3. The solid electrolyte layer 3 was formed so as to cover the top and side surfaces of the positive electrode mixture layer 2b and the top and side surfaces of the insulating layer 4a on the inner circumference side. The solid electrolyte layer 3 had a thickness of 180 μm.

(c) Fabrication of Negative Electrode 1

Natural graphite (D1 ($D_{50}$): 15 μm) serving as negative electrode active material particles, and solid electrolyte particles (d1 ($D_{50}$): approx. 4 μm) serving as the first group of particles were mixed at a mass ratio of 90:10 in a ball mill at 25° C. at a revolution speed of 96 rpm for 15 min. Here, $Li_2S$—$P_2S_5$ solid solution with lithium ion conductivity was used as the solid electrolyte particles.

Next, the obtained mixture (mixture A) and solid electrolyte particles (d2 ($D_{50}$): approx. 8 μm) serving as the second group of particles were mixed at a mass ratio of 85:15 in a ball mill under the same conditions as above, to give a mixture B.

With a mask placed over the solid electrolyte layer 3, the make having an opening of 20 mm long and 20 mm wide for exposing therefrom the center portion of the solid electrolyte layer 3, a negative electrode mixture layer 1b was formed by a dry process. Specifically, the mixture B was deposited in a predetermined amount so as to cover the opening of the mask, and pressed (compacted) in the thickness direction at a pressure of 2 MPa using a single action press, into the negative electrode mixture layer 1b. The negative electrode mixture layer 1b had a thickness of 100 μm. The amount of the mixture B to be deposited was adjusted so that the negative electrode capacity became 1.4 times as high as the positive electrode capacity.

On the negative electrode mixture layer 1b, a stainless-steel foil of 40 mm long, 40 mm wide, and 20 μm thick was laminated as a negative electrode current collector 1a. An annular electrically-insulating layer 4b was disposed on one side of the negative electrode current collector 1a at its periphery, so as to face the insulating layer 4a. The opening of the insulating layer 4b was square with a size of 32 mm×32 mm. Then, the insulating layer 4a and the insulating layer 4b were attached to each other, to form an electrode group.

(d) Assembly of Battery

The electrode group obtained in (c) above was inserted into a battery case made of a laminate film provided with a negative electrode lead and a positive electrode lead. While evacuating the gas from the battery case with a vacuum pump, the battery case was thermally fused and sealed. At this time, the positive electrode lead and the negative electrode lead were electrically connected to the positive electrode current collector 2a and the negative electrode current collector 1a, respectively. Thereafter, a pressure of 1000 MPa was applied to the electrode group together with the battery case, in the thickness direction of the electrode group, to complete an all-solid-state battery (monopolar cell).

(2) Evaluation

The all-solid-state battery fabricated in (1) above was subjected to the following charge and discharge test.

The all-solid-state battery was placed in a 25° C. thermostatic oven. While keeping the temperature unchanged, under atmospheric pressure (0.1 MPa), the battery was constant-current charged at a current density of 0.1 C to an end-of-charge voltage of 4.0 V, and constant-current discharged at a current density of 0.1 C to an end-of-discharge voltage of 2.7 V. The battery was evaluated by the following criteria. Good: the charge and discharge were favorably completed, and a capacity of 95% or more of the design capacity was obtained; Fair: the charge and discharge were favorably completed, and a capacity of 90% or more and less than 95% of the design capacity was obtained; Poor: no current flowed during charge, failing to complete the charge.

Similar tests were performed with the current density during charge and discharge set at 0.5 C, 1.0 C, and 1.2 C, respectively.

Example 2

$LiNi_{0.8}Co_{0.15}Al_{0.05}O_2$ (D1 ($D_{50}$): 11 μm) serving as the positive electrode active material particles, and solid electrolyte particles (d1 ($D_{50}$): approx. 4 μm) serving as the first group of particles were mixed at a mass ratio of 95:5 in a ball mill at 60° C. at a revolution speed of 96 rpm for 15 min. Here, $Li_2S$—$P_2S_5$ solid solution with lithium ion conductivity was used as the solid electrolyte particles. Next, the obtained mixture (mixture A) and solid electrolyte particles (d2 ($D_{50}$): approx. 8 μm) serving as a second group of particles were mixed at a mass ratio of 90:10 in a ball mill under the same conditions as above, to give a mixture B. A positive electrode was prepared in the same manner as in Example 1, except for using the obtained mixture B for forming the positive electrode mixture layer.

Natural graphite (D1 ($D_{50}$): 15 μm) serving as the negative electrode active material particles, and solid electrolyte particles (d1 ($D_{50}$): approx. 4 μm) were mixed at a mass ratio of 90:10 in a ball mill at 60° C. at a revolution speed of 96 rpm for 15 min. Here, $Li_2S$—$P_2S_5$ solid solution with lithium ion conductivity was used as the solid electrolyte particles. Next, the obtained mixture (mixture A) and solid electrolyte particles (d2 ($D_{50}$): approx. 8 μm) were mixed at a mass ratio of 85:15 in a ball mill under the same conditions as above, to give a mixture B. A negative electrode was prepared in the same manner as in Example 1, except for using the obtained mixture B for forming the negative electrode mixture layer.

An all-solid-state battery was fabricated and evaluated in the same manner as in Example 1, except for using the positive electrode and the negative electrode thus obtained.

Comparative Example 1

$LiNi_{0.8}Co_{0.15}Al_{0.05}O_2$ (D1 ($D_{50}$): 11 μm) serving as the positive electrode active material particles, and solid electrolyte particles (d1 ($D_{50}$): approx. 4 μm) serving as the first group of particles were mixed at a mass ratio of 70:30 in a ball mill at 25° C. at a revolution speed of 96 rpm for 30 min.

Here, $Li_2S$—$P_2S_5$ solid solution with lithium ion conductivity was used as the solid electrolyte particles. A positive electrode was prepared in the same manner as in Example 1, except for using the obtained mixture for forming the positive electrode mixture layer.

Natural graphite (D1 ($D_{50}$): 15 μm) serving as the negative electrode active material particles, and solid electrolyte particles (d1 ($D_{50}$): approx. 4 μm) were mixed at a mass ratio of 60:40 in a ball mill at 25° C. at a revolution speed of 96 rpm for 30 min. Here, $Li_2S$—$P_2S_5$ solid solution with lithium ion conductivity was used as the solid electrolyte particles. A negative electrode was prepared in the same manner as in Example 1, except for using the obtained mixture for forming the negative electrode mixture layer.

An all-solid-state battery was fabricated and evaluated in the same manner as in Example 1, except for using the positive electrode and the negative electrode thus obtained.

The results of Examples and Comparative Example are shown in Table 1.

TABLE 1

|  | Rate (C) | | | |
| --- | --- | --- | --- | --- |
|  | 0.1 | 0.5 | 1 | 1.2 |
| Example 1 | Good | Good | Good | Fair |
| Example 2 | Good | Good | Good | Good |
| Com. Example 1 | Good | Good | Poor | Poor |

Table 1 shows that Comparative Example failed to complete the charge at a high rate, whereas Examples were able to perform the charge and discharge favorably even at a high rate. This is probably because the ion conductivity in the electrodes in Comparative Example was low as compared to those in Examples.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the production method of the present invention, an electrode for all-solid-state batteries with improved ion conductivity can be obtained. An all-solid-state battery including such an electrode can perform charge and discharge favorably even at a high rate, and is therefore useful for various applications requiring excellent rate characteristics.

REFERENCE SIGNS LIST

1:negative electrode, 2:positive electrode, 1a:negative electrode current collector, 1b:negative electrode mixture layer; 2a:positive electrode current collector, 2b:positive electrode mixture layer, 3:solid electrolyte layer, 4a, 4b:insulating layer.

The invention claimed is:

1. A production method of an electrode for all-solid-state batteries,
the electrode having an electrode mixture layer containing active material particles and solid electrolyte particles,
the solid electrolyte particles including a first group of particles having an average particle diameter d1, and a second group of particles having an average particle diameter d2,
the method comprising:
a first mixing step of dry-mixing the active material particles and the first group of particles, to obtain a mixture A;
a second mixing step of dry-mixing the mixture A and the second group of particles, to obtain a mixture B; and
a pressing step of pressing the mixture B to form the electrode mixture layer, wherein
a ratio of the average particle diameter d2 to the average particle diameter d1: d2/d1 satisfies d2/d1≥1.5,
the average particle diameter d2 is 6 μm or more, and
the mixture A and the mixture B are obtained in the absence of a binder.

2. The method of claim 1, wherein the pressing step includes at least a step of pressing the mixture B at a pressure of 400 MPa or more and 1500 MPa or less.

3. The method of claim 1, wherein the average particle diameter d1 is 10 μm or less.

4. The method of claim 1, wherein an average particle diameter D1 of the active material particles and the average particle diameter d2 satisfy D1>d2.

5. The method of claim 1, wherein the average particle diameter D1 of the active material particles is 20 μm or less.

6. The method of claim 1, wherein the solid electrolyte particles comprise a sulfide containing Li and P.

7. The method of claim 1, wherein a ratio of an amount of the solid electrolyte particles to a total amount of the active material particles and the solid electrolyte particles is 5 mass % or more and 40 mass % or less, and a ratio of an amount of the first group of particles to a total amount of the first group of particles and the second group of particles is 10 mass % or more and 80 mass % or less.

8. A production method of an electrode for all-solid-state batteries,
the electrode having an electrode mixture layer containing active material particles and solid electrolyte particles,
the solid electrolyte particles including a first group of particles having an average particle diameter d1, and a second group of particles having an average particle diameter d2,
the method comprising:
a first mixing step of dry-mixing the active material particles and the first group of particles, to obtain a mixture A;
a second mixing step of dry-mixing the mixture A and the second group of particles, to obtain a mixture B; and
a pressing step of pressing the mixture B to form the electrode mixture layer, wherein
a ratio of the average particle diameter d2 to the average particle diameter d1: d2/d1 satisfies d2/d1≥1.5, and
mixing of the active material particles and the first group of particles is performed under heating.

9. A production method of an electrode for all-solid-state batteries,
the electrode having an electrode mixture layer containing active material particles and solid electrolyte particles,
the solid electrolyte particles including a first group of particles having an average particle diameter d1, and a second group of particles having an average particle diameter d2, the method comprising:
- a first mixing step of dry-mixing the active material particles and the first group of particles, to obtain a mixture A;
- a second mixing step of dry-mixing the mixture A and the second group of particles, to obtain a mixture B; and
- a pressing step of pressing the mixture B to form the electrode mixture layer, wherein
- a ratio of the average particle diameter d2 to the average particle diameter d1: d2/d1 satisfies d2/d1≥1.5, and
- mixing of the mixture A and the second group of particles is performed under heating.

10. A production method of an all-solid-state battery, the method comprising
- a step of forming an electrode group, the electrode group including a first electrode, a second electrode having a polarity opposite to a polarity of the first electrode, and a solid electrolyte layer interposed between the first electrode and the second electrode, wherein:
- the step of forming the electrode group includes a first-electrode forming step of forming the first electrode, a step of forming the solid electrolyte layer by using an ion-conductive solid electrolyte by a dry process, and a second-electrode forming step of forming the second electrode, and
- at least one of the first-electrode forming step and the second-electrode forming step includes the method of claim 1.

11. A production method of an electrode for all-solid-state batteries,
- the electrode having an electrode mixture layer containing active material particles and solid electrolyte particles,
- the solid electrolyte particles including a first group of particles having an average particle diameter d1, and a second group of particles having an average particle diameter d2,
- the method comprising:
- a first mixing step of dry-mixing the active material particles and the first group of particles, to obtain a mixture A;
- a second mixing step of dry-mixing the mixture A and the second group of particles, to obtain a mixture B; and
- a pressing step of pressing the mixture B to form the electrode mixture layer, wherein
- a ratio of the average particle diameter d2 to the average particle diameter d1: d2/d1 satisfies d2/d1≥1.5, and
- the pressing step includes at least a step of pressing the mixture B at a pressure of 1000 MPa or more and 1500 MPa or less.

12. A production method of an all-solid-state battery, the method comprising
- a step of forming an electrode group, the electrode group including a first electrode, a second electrode having a polarity opposite to a polarity of the first electrode, and a solid electrolyte layer interposed between the first electrode and the second electrode, wherein:
- the step of forming the electrode group includes a first-electrode forming step of forming the first electrode, a step of forming the solid electrolyte layer by using an ion-conductive solid electrolyte by a dry process, and a second-electrode forming step of forming the second electrode, and
- at least one of the first-electrode forming step and the second-electrode forming step includes the method of claim 8.

13. A production method of an all-solid-state battery, the method comprising
- a step of forming an electrode group, the electrode group including a first electrode, a second electrode having a polarity opposite to a polarity of the first electrode, and a solid electrolyte layer interposed between the first electrode and the second electrode, wherein:
- the step of forming the electrode group includes a first-electrode forming step of forming the first electrode, a step of forming the solid electrolyte layer by using an ion-conductive solid electrolyte by a dry process, and a second-electrode forming step of forming the second electrode, and
- at least one of the first-electrode forming step and the second-electrode forming step includes the method of claim 9.

14. A production method of an all-solid-state battery, the method comprising
- a step of forming an electrode group, the electrode group including a first electrode, a second electrode having a polarity opposite to a polarity of the first electrode, and a solid electrolyte layer interposed between the first electrode and the second electrode, wherein:
- the step of forming the electrode group includes a first-electrode forming step of forming the first electrode, a step of forming the solid electrolyte layer by using an ion-conductive solid electrolyte by a dry process, and a second-electrode forming step of forming the second electrode, and
- at least one of the first-electrode forming step and the second-electrode forming step includes the method of claim 11.

\* \* \* \* \*